(12) United States Patent
Nishikawa

(10) Patent No.: US 9,513,159 B2
(45) Date of Patent: Dec. 6, 2016

(54) SOLAR SIMULATOR LIGHT-AMOUNT EVALUATION APPARATUS, SOLAR SIMULATOR LIGHT-AMOUNT EVALUATION METHOD, SOLAR CELL EVALUATION APPARATUS, AND SOLAR CELL EVALUATION METHOD

(75) Inventor: Yoshihiro Nishikawa, Kobe (JP)

(73) Assignee: KONICA MINOLTA, INC., Tokyo (JP)

( * ) Notice: Subject to any disclaimer, the term of this patent is extended or adjusted under 35 U.S.C. 154(b) by 997 days.

(21) Appl. No.: 13/634,272

(22) PCT Filed: Feb. 18, 2011

(86) PCT No.: PCT/JP2011/053472
§ 371 (c)(1),
(2), (4) Date: Sep. 12, 2012

(87) PCT Pub. No.: WO2011/114835
PCT Pub. Date: Sep. 22, 2011

(65) Prior Publication Data
US 2013/0006556 A1  Jan. 3, 2013

(30) Foreign Application Priority Data
Mar. 15, 2010 (JP) ................. 2010-057254

(51) Int. Cl.
*G01J 1/08* (2006.01)
*F21S 8/00* (2006.01)
(Continued)

(52) U.S. Cl.
CPC ............... *G01J 1/08* (2013.01); *F21S 8/006* (2013.01); *H02S 50/10* (2014.12); *G01J 1/32* (2013.01)

(58) Field of Classification Search
CPC ........................................... G01J 1/08
(Continued)

(56) References Cited

U.S. PATENT DOCUMENTS

2001/0024274 A1* 9/2001 Shimizu ............... G01J 3/28
356/326
2002/0014886 A1* 2/2002 Matsuyama ............ H02S 50/10
324/96

(Continued)

FOREIGN PATENT DOCUMENTS

| JP | 11-54776 A | 2/1999 |
| JP | 2004-94660 A | 3/2004 |
| WO | 2010/058649 A1 | 5/2010 |

OTHER PUBLICATIONS

International Search Report for International Application No. PCT/JP2011/053472, mailed Apr. 19, 2011, with English translation.

(Continued)

*Primary Examiner* — Raymond Nimox
(74) *Attorney, Agent, or Firm* — Cantor Colburn LLP

(57) ABSTRACT

The provided solar simulator light-intensity evaluation apparatus and method can evaluate the characteristics of a solar cell in an arbitrary place at an arbitrary time and date, using an existing solar simulator, as follows: an estimated spectral irradiance of the natural sunlight is calculated under a measurement condition including a place and/or a time and date where and when the solar cell is measured; and an target value of adjustment and estimated light amount value of the solar simulator are calculated under the measurement condition, on the basis of the estimated spectral irradiance having been calculated, the spectral irradiance of the solar simulator, and solar cell information including a spectral sensitivity of the solar cell.

13 Claims, 7 Drawing Sheets

(51) Int. Cl.
*H02S 50/10* (2014.01)
*G01J 1/32* (2006.01)

(58) Field of Classification Search
USPC .......................................................... 702/64
See application file for complete search history.

(56) References Cited

U.S. PATENT DOCUMENTS

| 2002/0030153 | A1* | 3/2002 | Matsuyama | H02S 50/10 250/214.1 |
| 2004/0056648 | A1* | 3/2004 | Matsuyama | H02S 50/10 324/96 |
| 2006/0076501 | A1* | 4/2006 | Yagi | G01J 1/429 250/372 |
| 2006/0290344 | A1* | 12/2006 | Shimotomai | G01J 1/08 324/750.02 |

OTHER PUBLICATIONS

"Primary Reference Solar Cells", Japanese Industrial Standard, JIS C 8910, 2001.
Yamagami, Yusuke et al. "Electric Power Output of PV power systems with environmental factors at various districts in Japan", The Transactions of the Institute of Electrical Engineers of Japan, B, A publication of Power and Energy Society, vol. 119, No. 5 (1999)—Abstract Only.

* cited by examiner

FIG. 3

(1) SAKAI-CITY OSAKA-PREFECTURE JAPAN
(2) 34°34' LATITUDE NORTH, 135°29' LONGITUDE EAST
(3) ALTITUDE 10 m
(4) FEBRUARY 23, 10 O'CLOCK AM
(5) FINE, 10 °C, RH 50%
(6) DATA OF SPECTRAL IRRADIANCE

...

(1) WASHINGTON, D.C. USA
(2) 38°54' LATITUDE NORTH, 77°02' LONGITUDE WEST
(3) ALTITUDE 20 m
(4) AUGUST 10, 2 O'CLOCK PM
(5) FINE, 30 °C, RH 60%
(6) DATA OF SPECTRAL IRRADIANCE

...

SOLAR SIMULATOR LIGHT-AMOUNT EVALUATION APPARATUS, SOLAR SIMULATOR LIGHT-AMOUNT EVALUATION METHOD, SOLAR CELL EVALUATION APPARATUS, AND SOLAR CELL EVALUATION METHOD

CROSS REFERENCE TO RELATED APPLICATIONS

This is a U.S. national stage of application No. PCT/JP2011/053472, filed on 18 Feb. 2011. Priority under 35 U.S.C. §119(a) and 35 U.S.C. §365(b) is claimed from Japanese Application No. 2010-057254, filed 15 Mar. 2010, the disclosure of which are also incorporated herein by reference.

TECHNICAL FIELD

The present invention relates to a solar simulator light-amount evaluation apparatus, a solar simulator light-amount evaluation method, a solar cell evaluation apparatus, and a solar cell evaluation method, in particular, relates to a solar simulator light-amount evaluation apparatus, a solar simulator light-amount evaluation method, a solar cell evaluation apparatus, and a solar cell evaluation method which enables the evaluation of characteristics of a solar cell for an arbitrary place and an arbitrary time and date.

BACKGROUND ART

Solar cells are actively developed to deal with current environmental issues and energy issues, and various kinds of materials including from conventional single crystal silicon to thin film silicon, organic compound, and dye sensitization have been developed. In addition, various structures including from a conventional single junction to a lamination type multi junction have been developed.

In view of the above situation, methods of fairly evaluating photoelectric conversion efficiencies of those solar cells are provided in the internationally standardized methods of evaluation, IEC60904 and JIS (C8905-C8991). Those provisions are summarized as follows: generated electric power of a solar cell is measured under illumination of an illumination device (herein after, referred to as solar simulator) that irradiates light simulated to have the same spectroscopic spectrum and irradiance as the standard sunlight.

Here, the standard sunlight represents sunlight with AM 1.5, which is sunlight obliquely entering the earth's surface through 1.5 times optical path length of AM 1.0, where the sunlight of Air Mass (hereinafter, referred to as AM) 1.0 is defined as the sunlight perpendicularly entering the earth's surface. Generally, it is the light from the sun having an elevation angle of 41.8 degrees relative to the earth's surface, and the sunlight from the bright and clear sky in spring or autumn in Japan is relatively close to the standard sunlight.

However, it is difficult for individual inspection agencies and business entities to have and operate solar simulators having the same spectroscopic spectrum and irradiance as the standard sunlight. For this reason, as a practical way, a standard solar cell having the same relative spectral sensitivity characteristics as a solar cell is made and calibrated by using a highly-simulated solar simulator having characteristics ultimately similar to a standard sunlight owned by public institutions (for example, the National Institute of Advanced Industrial Science and Technology in Japan). The individual inspection agencies and business entities adjust the light amount of their own solar simulator by using the calibrated standard solar cell and then measure a solar cell.

For example, in Non-Patent Document 1, a short-circuit current value of the solar cell similar to an object to be measured is measured under the illumination condition having a spectral irradiance similar to that of the standard sunlight, and the solar cell is made to be a standard solar cell being assigned a short-circuit current value whose spectrum-nonsimilarity error has been corrected. The following method is provided such that: the standard solar cell having been assigned the short-circuit current value is placed under the solar simulator; and the light amount of the solar simulator is adjusted so that the short-circuit current value of the standard solar cell is equal to the short-circuit current value; then the characteristics of the solar cell to be measured is evaluated.

RELATED ART DOCUMENT

Non-Patent Document

Non-Patent Document 1: JIS C8910

SUMMARY OF THE INVENTION

Object of the Invention

However, with the method disclosed in Non-Patent Document 1, the characteristics of a solar cell can be measured only under the standard sunlight, and solar cells are installed in various places in the world and in the outer space in some cases; thus there is a demand of evaluating the characteristics for the place of installation.

In addition, as a recent trend, an annual energy production in addition to the characteristics under the standard sunlight is listed as catalogue data of a solar cell more often than ever; however with the conventional method, the annual energy production only can be obtained by measuring the energy production for one year with the cell set in position, but the energy production cannot be obtained for arbitrary place and an arbitrary time and date.

The present invention has been made in view of the above issues, and an object thereof is to provide a solar simulator light-amount evaluation apparatus, a solar simulator light-amount evaluation method, a solar cell evaluation apparatus, and a solar cell evaluation method in which the characteristics of a solar cell can be evaluated for an arbitrary place and arbitrary time and date by using the existing solar simulator.

Means for Solving the Object

An object of the present invention is achieved by the following configurations.

Item 1. A solar simulator light-amount evaluation apparatus for adjusting a light amount of a solar simulator used as an illumination light source used for measuring characteristics of a solar cell, the apparatus comprising:

a measurement section configured to measure a spectral irradiance of irradiation light of the solar simulator;

an input section configured to input a measurement condition including at least one of a place and a time and date;

a first calculation section configured to calculate an estimated spectral irradiance of a natural sunlight for the measurement condition;

a second storage section configured to store solar cell information including a spectral sensitivity of the solar cell; and a second calculation section configured to calculate a target value of adjustment of the light amount of the solar simulator under the measurement condition on the basis of the estimated spectral irradiance and the solar cell information, and configured to calculate an estimated light amount of the solar simulator on the basis of the measured spectral irradiance and the stored solar cell information.

Item 2. The solar simulator light-amount evaluation apparatus of item 1, comprising:

a display configured to display the calculated target value of adjustment and the estimated light amount having been calculated.

Item 3. The solar simulator light-amount evaluation apparatus of item 1, comprising:

a first storage section configured to store a plurality pieces of natural sunlight information including spectral irradiances of the natural sunlight measured under a plurality of measurement conditions including at least one kind of different places and time and dates, wherein the first calculation section sets the spectral irradiance of the natural sunlight information measured under the measurement condition which coincides with or is closest to the input measurement condition as the estimated spectral irradiance.

Item 4. The solar simulator light-amount evaluation apparatus of item 1, comprising:

a first storage section configured to store a plurality pieces of natural sunlight information including spectral irradiances of the natural sunlight measured under a plurality of measurement conditions including at least different places and time and dates, wherein the first calculation section calculates the estimated spectral irradiance by linear interpolating the spectral irradiances in the natural sunlight information measured each at each of the time and dates closest to the time and date in the input measurement condition at two places closest to the place in the input measurement condition.

Item 5. The solar simulator light-amount evaluation apparatus of item 1, comprising:

a first storage section configured to store a plurality pieces of natural sunlight information including spectral irradiances of the natural sunlight measured under a plurality of measurement conditions including at least different places and different time and dates, wherein the first calculation section calculates the estimated spectral irradiance by high-order curve interpolating the spectral irradiances in the natural sunlight information measured at the time and dates close to the time and date in the input measurement condition at a plurality of places close to the place in the input measurement condition.

Item 6. The solar simulator light-amount evaluation apparatus of item 1, wherein the solar simulator includes a light amount adjustment section configured to adjust an irradiation light amount of the solar simulator;

the second calculation section calculate a target short-circuit current value of the solar cell, which is the target value of adjustment, according to the following Equation 1, and calculates an estimated short-circuit current value of the solar cell, which is the estimated light amount, according to the following Equation 2; and the light amount adjustment section adjusts the irradiation light amount of the solar simulator so that the estimated short-circuit current value having been calculated falls within an acceptable error range of the calculated target short-circuit current value:

$$Iscref = \int Sc(\lambda) \cdot P(\lambda) d\lambda \qquad \text{Equation 1}$$

$$Iscx = \int L(\lambda) \cdot P(\lambda) d\lambda \qquad \text{Equation 2}$$

where:

Iscref is the target short-circuit current value of the solar cell;

Iscx is the estimated short-circuit current value of the solar cell;

$P(\lambda)$ is the spectral sensitivity of the solar cell;

$Sc(\lambda)$ is the estimated spectral irradiance of the natural sunlight;

$L(\lambda)$ is the spectral irradiance of the irradiation light of the solar simulator; and $\lambda$ is a wavelength of light.

Item 7. A solar simulator light-amount evaluation method for adjusting a light amount of a solar simulator used as an illumination light source used for measuring characteristics of a solar cell, the method comprising:

an input step for inputting a measurement condition including at least one of a place and a time and date;

a first calculation step for calculating an estimated spectral irradiance of a natural sunlight under the measurement condition;

a second readout step for reading out a previously stored solar cell information including a spectral sensitivity of the solar cell;

a measurement step for measuring a spectral irradiance of an irradiation light of the solar simulator;

a second calculation step for calculating a target value of adjustment of the light amount of the solar simulator, under the measurement condition, on the basis of the estimated spectral irradiance and the solar cell information, and for calculating an estimated light amount of the solar simulator on the basis of the measured spectral irradiance and the read out solar cell information.

Item 8. The solar simulator light-amount evaluation method of item 7, comprising:

a display step for displaying the calculated target value of adjustment and the estimated light amount.

Item 9. The solar simulator light-amount evaluation method of item 7, comprising:

a first readout step for reading out natural sunlight information measured under the measurement condition which coincides with or is closest to the input measurement condition, from a plurality pieces of natural sunlight information including spectral irradiances of the natural sunlight measured under a plurality of measurement conditions including at least one kind of previously stored different places and time and dates, wherein in the first calculation step, the spectral irradiance of the read out natural sunlight information is set as the estimated spectral irradiance.

Item 10. The solar simulator light-amount evaluation method of item 7, comprising:

a first readout step for reading out pieces of natural sunlight information each measured under each of the time and dates closest to the time and date in the input measurement condition at two places closest to the place in the input measurement condition, from a plurality pieces of natural sunlight information including spectral irradiances of the natural sunlight measured under a plurality of measurement conditions including at least one kind of previously stored different places and time and dates, wherein in the first calculation step, the estimated spectral irradiance is calculated by linear interpolating the spectral irradiances in the read out natural sunlight information.

Item 11. The solar simulator light-amount evaluation method of item 7, comprising:

a first readout step for reading out a plurality pieces of natural sunlight information measured at the time and dates close to the time and date in the input measurement condition at a plurality of places close to the place in the input measurement condition, from a plurality pieces of natural sunlight information including the spectral irradiance of the natural sunlight measured under a plurality of measurement conditions including at least one kind of previously stored different places and different time and dates, wherein in the first calculation step, the estimated spectral irradiance is calculated by high-order curve interpolating the spectral irradiances in the read out plurality pieces of natural sunlight information.

Item 12. The solar simulator light-amount evaluation method of item 7, comprising:

a light amount adjustment step for adjusting adjust an irradiation light amount of the solar simulator, wherein in the second calculation step, a target short-circuit current value of the solar cell, which is the target value of adjustment, is calculated according to the following Equation 1, and an estimated short-circuit current value of the solar cell, which is the estimated light amount, is calculated according to the following Equation 2, and wherein in the light amount adjustment step, the irradiation light amount of the solar simulator is adjusted so that the estimated short-circuit current value having been calculated falls within an acceptable error range of the calculated target short-circuit current value:

$$Iscref = \int Sc(\lambda) \cdot P(\lambda) d\lambda \qquad \text{Equation 1}$$

$$Iscx = \int L(\lambda) \cdot P(\lambda) d\lambda \qquad \text{Equation 2}$$

where:
Iscref is the target short-circuit current value of the solar cell;
Iscx is the estimated short-circuit current value of the solar cell;
$P(\lambda)$ is the spectral sensitivity of the solar cell;
$Sc(\lambda)$ is the estimated spectral irradiance of the natural sunlight;
$L(\lambda)$ is the spectral irradiance of the irradiation light of the solar simulator; and
$\lambda$ is a wavelength of light.

Item 13. A solar cell evaluation apparatus for evaluating a solar cell, used with a solar simulator which is an illumination light source used for measuring characteristics of a solar cell and with current/voltage meter for measuring a short-circuit current value of a solar cell illuminated by the solar simulator, the apparatus comprising:

a measurement section configured to measure a spectral irradiance of irradiation light of the solar simulator;

an input section configured to input a measurement condition including at least one of a place and a time and date where and when the solar cell is subjected to measurement;

a first calculation section configured to calculate an estimated spectral irradiance of a natural sunlight under the measurement condition;

a second storage section configured to store solar cell information including a spectral sensitivity of the solar cell;

a third calculation section configured to calculate a converted short-circuit current value of the solar cell under the measurement condition, based on the spectral irradiance, the estimated spectral irradiance, the solar cell information, and the short-circuit current value of the solar cell measured by the current/voltage meter.

Item 14. The solar cell evaluation apparatus of item 13, comprising:

a first storage section configured to store a plurality pieces of natural sunlight information including spectral irradiances of the natural sunlight measured under a plurality of measurement conditions including at least one kind of different places and different time and dates, wherein the first calculation section sets the spectral irradiance of the natural sunlight information measured under the measurement condition which coincides with or is closest to the input measurement condition as the estimated spectral irradiance.

Item 15. The solar cell evaluation apparatus of item 13, comprising:

a first storage section configured to store a plurality pieces of natural sunlight information including spectral irradiances of the natural sunlight measured under a plurality of measurement conditions including at least different places and different time and dates, wherein the first calculation section calculates the estimated spectral irradiance by linear interpolating the spectral irradiances in the natural sunlight information measured each at each of the time and dates closest to the time and date in the input measurement condition at two places closest to the place in the input measurement condition.

Item 16. The solar cell evaluation apparatus of item 13, comprising:

a first storage section configured to store a plurality pieces of natural sunlight information including spectral irradiances of the natural sunlight measured under a plurality of measurement conditions including at least different places and different time and dates, wherein the first calculation section calculates the estimated spectral irradiance by linear interpolating the spectral irradiances in the natural sunlight information measured at the time and dates close to the time and date in the input measurement condition at a plurality of places close to the place in the input measurement condition.

Item 17. The solar cell evaluation apparatus of item 13, wherein the third calculation section calculates the converted short-circuit current value of the solar cell according to the following Equation 3:

$$Iscc = Isc \cdot \{\int Sc(\lambda) \cdot P(\lambda) d\lambda\} / \{\int L(\lambda) \cdot P(\lambda) d\lambda\} \qquad \text{Equation 3}$$

where:
Iscc is the converted short-circuit current value of the solar cell;
Isc is the short-circuit current value of the solar cell;
$P(\lambda)$ is the spectral sensitivity of the solar cell;
$Sc(\lambda)$ is the estimated spectral irradiance of the natural sunlight;
$L(\lambda)$ is the spectral irradiance of the irradiation light of the solar simulator; and
$\lambda$ is a wavelength of light.

Item 18. A solar cell evaluation method for evaluating a solar cell illuminated by a solar simulator, the method comprising:

an input step for inputting a measurement condition including at least one of a place and a time and date where and when the solar cell is subjected to measurement;

a first calculation step for calculating an estimated spectral irradiance of a natural sunlight under the measurement condition;

a second readout step for reading out previously stored solar cell information including a spectral sensitivity of the solar cell;

a measurement step for measuring a spectral irradiance of irradiation light of the solar simulator;

a short-circuit current value measurement step for measuring a short-circuit current value of the solar cell; and a third calculation step for calculating a converted short-circuit current value of the solar cell under the measurement condition, based on the spectral irradiance, the estimated spectral irradiance, the solar cell information, and the short-circuit current value.

Item 19. The solar cell evaluation method of item 18, comprising:

a first readout step for reading out natural sunlight information measured under the measurement condition which coincides with or is closest to the input measurement condition, from a plurality pieces of natural sunlight information including spectral irradiances of the natural sunlight measured under a plurality of measurement conditions including at least one kind of previously stored different places and time and dates, wherein in the first calculation step, the spectral irradiance of the read out natural sunlight information is set as the estimated spectral irradiance.

Item 20. The solar cell evaluation method of item 18, comprising:

a first readout step for reading out pieces of natural sunlight information each measured under each of the time and dates closest to the time and date in the input measurement condition at two places closest to the place in the input measurement condition, from a plurality pieces of natural sunlight information including spectral irradiances of the natural sunlight measured under a plurality of measurement conditions including at least one kind of previously stored different places and different time and dates, wherein in the first calculation step, the estimated spectral irradiance is calculated by linear interpolating the spectral irradiances in the read out natural sunlight information.

Item 21. The solar cell evaluation method of item 18, comprising:

a first readout step for reading out a plurality pieces of natural sunlight information measured at the time and dates close to the time and date in the input measurement condition at a plurality of places close to the place in the input measurement condition, from a plurality pieces of natural sunlight information including the spectral irradiance of the natural sunlight measured under a plurality of measurement conditions including at least one kind of previously stored different places and different time and dates, wherein in the first calculation step, the estimated spectral irradiance is calculated by high-order curve interpolating the spectral irradiances in the read out plurality pieces of natural sunlight information.

Item 22. The solar cell evaluation method of item 18, wherein in the third calculation step, the converted short-circuit current value of the solar cell is calculated according to the following Equation 3:

$$Iscc = Isc \cdot \{\int Sc(\lambda) \cdot P(\lambda) d\lambda\} / \{\int L(\lambda) \cdot P(\lambda) d\lambda\} \quad \text{Equation 3}$$

where:

Iscc is the converted short-circuit current value of the solar cell;

Isc is the short-circuit current value of the solar cell;

$P(\lambda)$ is the spectral sensitivity of the solar cell;

$Sc(\lambda)$ is the estimated spectral irradiance of the natural sunlight;

$L(\lambda)$ is the spectral irradiance of the irradiation light of the solar simulator; and $\lambda$ is a wavelength of light.

Advantage of the Invention

According to the present invention, an estimated spectral irradiance of a natural sunlight under the measurement condition including a place and a time and date where and when the measurement of a solar cell is conducted is calculated, and a target value of adjustment and an estimated light amount value of a solar simulator under a measurement condition are calculated on the basis of solar cell information including spectral sensitivity of the solar cell, the estimated spectral irradiance having been calculated, and a spectral irradiance of radiation light of the solar, whereby a solar simulator light-amount evaluation apparatus and a solar simulator light-amount evaluation method are provided in which the characteristics of the solar cell can be evaluated for an arbitrary place and an arbitrary time and date by using the existing solar simulator.

Alternatively, the estimated spectral irradiance of the natural sunlight under the measurement condition including the place and the time and date where and when the solar cell is subjected to measurement is calculated, and the converted short-circuit current value of the solar cell under the measurement condition on the basis of the estimated spectral irradiance having been calculated and the solar cell information including the spectral sensitivity of the solar cell, the solar simulator spectral irradiance of the irradiation light, and the short-circuit current value of the solar cell measured under the illumination of the solar simulator; thus a solar cell evaluation apparatus and a solar cell evaluation method are provided in which the characteristics of a solar cell can be evaluated for an arbitrary place and time by using the existing solar simulator.

BRIEF DESCRIPTION OF THE DRAWINGS

FIG. 3 is a schematic diagram of an example of a data base of natural sunlight information;

BEST MODE FOR CARRYING OUT THE INVENTION

Figure 1:
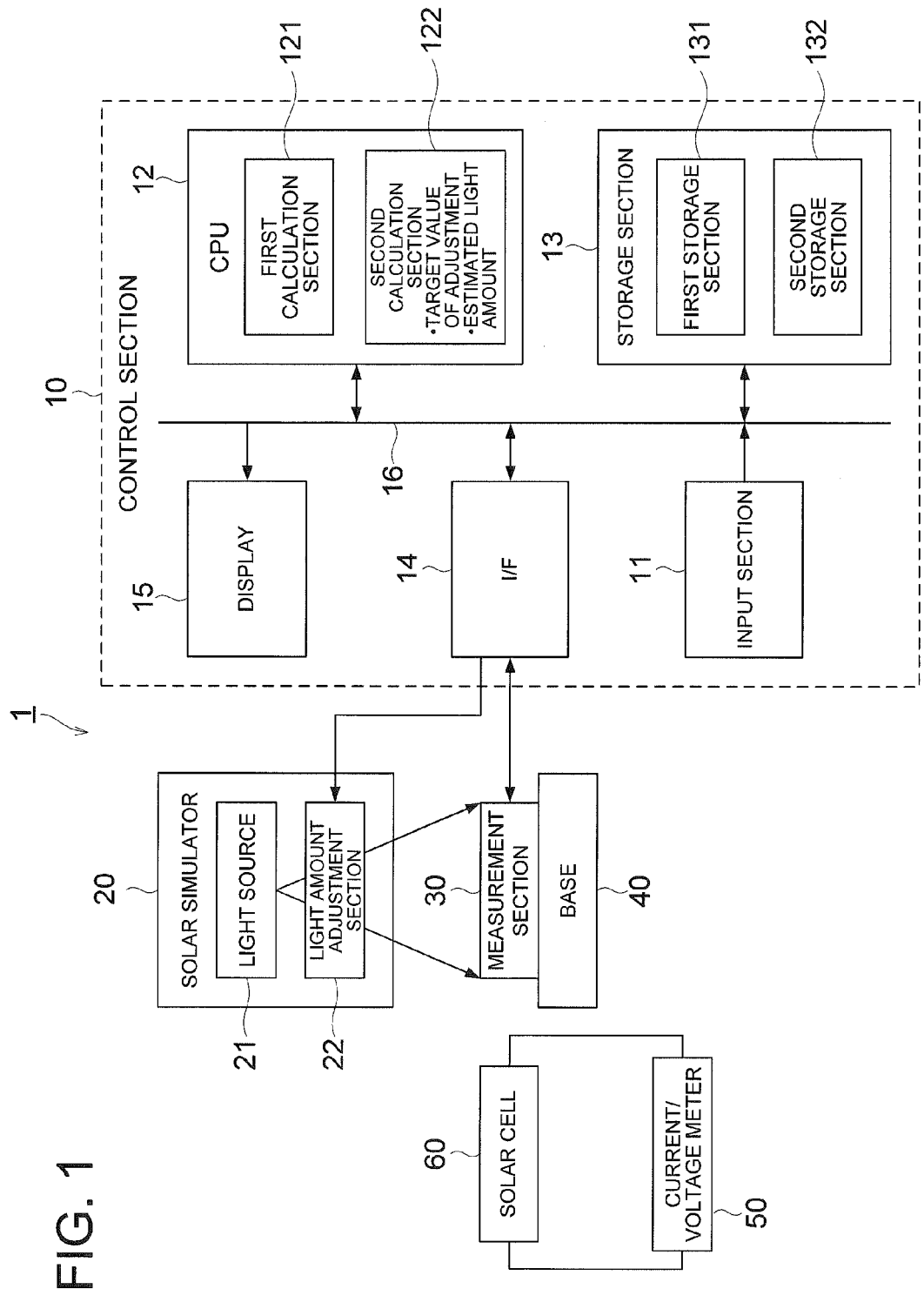
FIG. 1 is a block diagram showing an example of a configuration of an embodiment of a solar simulator light-amount evaluation apparatus.

The present invention will be described with reference to an embodiment shown in the drawings; however the present invention is not limited to the embodiment. In the drawings, the same reference numerals are assigned to the same or similar portions, and redundant description may be omitted.

First, an embodiment of a solar simulator light-amount evaluation apparatus according to the present invention will be described with reference to FIG. 1. FIG. 1 is a block diagram showing an example of a configuration of the embodiment of the solar simulator light amount evaluation apparatus.

In FIG. 1, a solar simulator light-amount evaluation apparatus 1 is constituted by a control section 10, a measurement section 30, and the like, and is used, together with a base 40, to adjust a solar simulator 20. The solar simulator light-amount evaluation apparatus 1 may be configured with the control section 10 and the measurement section that are integrated in one body, or configured with the separate control section 10 and measurement section 30.

First, a solar simulator 20, which is an illumination light source for measuring the characteristics of a solar cell, is configured with a light source 21 and a light amount adjustment section 22. The light source 21 is a bulb or the like mounted on the base 40 to illuminate a solar cell 60, and the light amount adjustment section 22 is a density-controllable filter, a variable voltage source, or the like; thus the light amount of the light source 21 is adjusted as described below, for example, manually according to the display of a display 15 of the control section 10.

The base 40 is a temperature-controlled base on which the solar cell 60 is placed to be illuminated by the solar simulator 20.

The control section 10 is made up of an input section 11, a CPU 12, a storage section 13, an interface section (hereinafter, referred to as I/F) 14, a display 15, and the like, and each section is connected to each other directly or through a bus 16. The input section 11 is, for example, a keyboard, a mouse, or the like and is used to input different information and instructions.

The CPU 12 is a microcomputer, for example, and controls the operation of the solar simulator light-amount evaluation apparatus 1 according to a program stored in the storage section 13. The CPU 12 is equipped with a first calculation section 121 for calculating an estimated spectral irradiance $Sc(\lambda)$ of a natural sunlight under a measurement condition and a second calculation section 122, to be described below, for calculating a target short-circuit current value and an estimated short-circuit current value of the solar cell.

The storage section 13 is, for example, a storage member such as a ROM, a RAM, and a hard disc, and stores and outputs a program for controlling the operation of the solar simulator light-amount evaluation apparatus 1. The storage section 13 has a first storage section 131 for storing a natural sunlight information SI of the natural sunlight, for different places and time and dates, having been previously measured, and has a second storage section 132 for storing solar cell information Ipv, of the solar cell 60, including a spectral sensitivity $P(\lambda)$ of the solar cell 60.

The I/F section 14 is an interface for connecting the control section 10 and the measurement section 30. Alternatively, if the solar simulator 20 is made to be automatically adjusted, the light amount adjustment section 22 of the solar simulator 20 and the control section 10 are connected through the I/F section 14. The display 15 is a liquid crystal monitor, for example, to display different input/output data, calculation results, and the like.

The measurement section 30 is a spectroradiometer for measuring a spectroscopic spectrum of incident light, and is mounted on the base 40 at a position where the solar cell is placed, to measure a spectral irradiance $L(\lambda)$ of irradiation light of the solar simulator 20. The measurement section 30 is connected to the control section 10 through the I/F section 14.

By using the solar simulator 20 adjusted with the solar simulator light-amount evaluation apparatus 1 and the current/voltage meter 50, the solar cell 60 is evaluated. The current/voltage meter 50 is a measuring instrument for measuring a current-voltage characteristic (I-V characteristics) of the solar cell 60. From the measurement result of the current/voltage meter 50, the characteristics such as a short-circuit current value Isc, a generation capacity, an electric-generating capacity, and a conversion efficiency of the solar cell 60 are evaluated.

Figure 2:
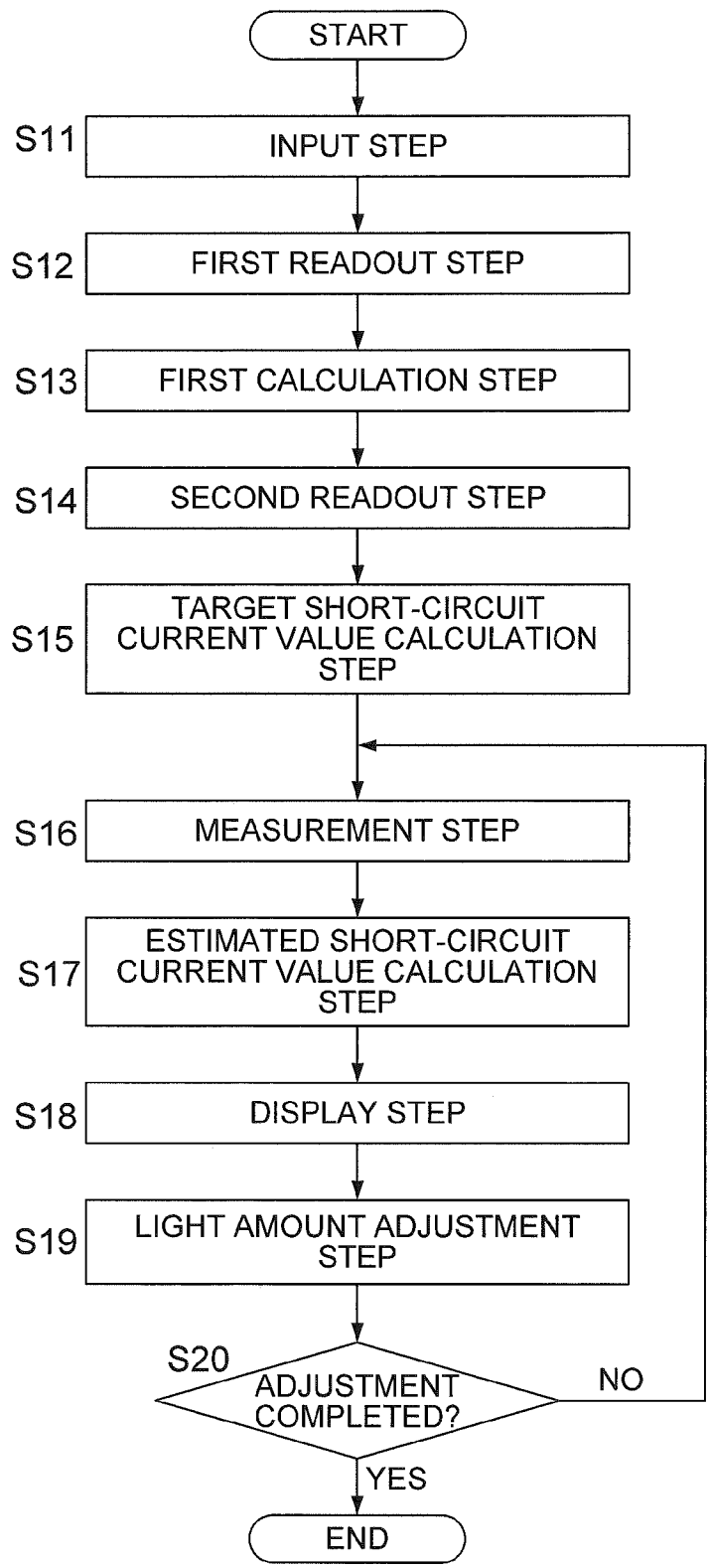
FIG. 2 is a process chart showing an example of an operation of light amount adjustment in the embodiment of the solar simulator light-amount evaluation apparatus.

Next, an operation of the embodiment of the solar simulator light-amount evaluation apparatus according to the present invention will be described with reference to FIG. 2. FIG. 2 is a process chart showing an example of an operation of light amount adjustment of the embodiment according to the solar simulator light-amount evaluation apparatus.

In FIG. 2, a measurement condition MCc of a solar cell is input from the input section 11 in step S11 (input step). The measurement condition MCc may include: (1) the name of the measurement place; (2) the latitude and longitude of the measurement place; (3) the altitude of the measurement place; and (4) the time and date of the measurement. In addition, information including (5) the weather, temperature, and humidity at the time of measurement may be included.

By adjusting the irradiation light amount of the solar simulator 20 according to the input measurement condition MCc, the characteristics of the solar cell can be evaluated under the illumination of the solar simulator 20 for an arbitrary place and time.

In this description of the embodiment, the information of (1) or (2) and (4) is assumed to be input as the measurement condition. Examples include a combination of (1) Sakai city Osaka prefecture Japan and (4) February 23, 10:00 o'clock, or a combination of (2) 34°34' latitude north, and 135°29' longitude east and (4) February 23, 10:00 o'clock. Other than on the earth's surface, the altitude information of (3) in the sky and outer space may be required The information may be input by a keyboard or by clicking, by a mouse, on the position of a map displayed on display 15, and the method for input is not limited.

In step S12 (first readout step), the natural sunlight information SI for a place and a time and date that coincide with or are closest to the measurement condition MCc input in step S11 is selected and read out from the plurality pieces of natural sunlight information SI stored in the first storage section 131 of the storage section 13.

The natural sunlight information SI shows the characteristics, including the data of spectral irradiance $S(\lambda)$, of the natural sunlight previously measured under the measurement conditions including different places, altitudes, time and dates, and it is stored in the first storage section 131 of the storage section 13, as a data base exemplified in FIG. 3. FIG. 3 is a schematic diagram showing an example of the data base of the natural sunlight information SI. This data base is made up by correcting the measurement data of the public institutes and research institutes and accumulating the data measured in-house.

In step S13 (first calculation step), the spectral irradiance $S(\lambda)$ in the natural sunlight information SI for the place and the time and date that coincide with or are closest to the measurement condition MCc readout in step S12 is set as an estimated spectral irradiance $Sc(\lambda)$.

Figure 4:
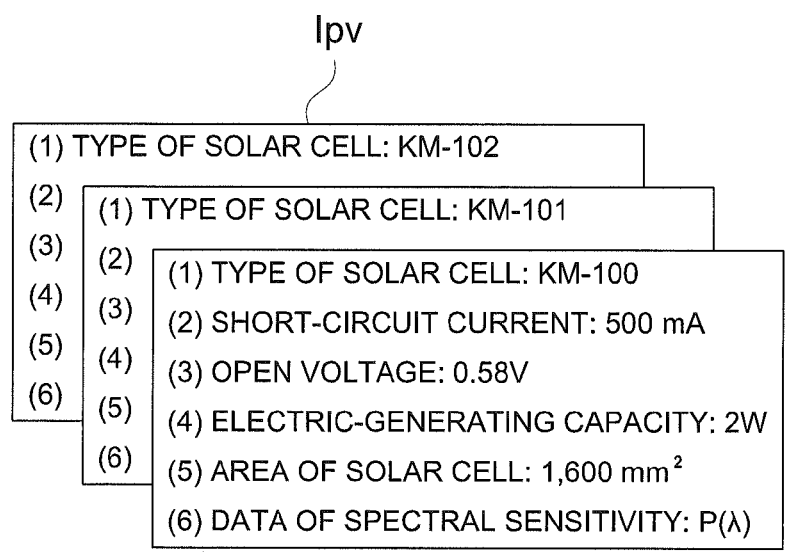
FIG. 4 is a schematic diagram showing an example of a data base of the solar cell information.

In step S14 (second readout step), the solar cell information Ipv of the solar cell 60 is read out from the plurality pieces of solar cell information Ipv previously stored in the second storage section 132 of the storage section 13. The solar cell information Ipv is the characteristics of the solar cell 60 under the standard measurement condition (spectral irradiance for AM1.5, temperature of 25° C.), is information including a spectral sensitivity $P(\lambda)$, a short-circuit current value, an electric-generating capacity, a type, and the like of the solar cell 60, and is stored in the second storage section 132 of the storage section 13 as a data base exemplified in FIG. 4. FIG. 4 is a schematic diagram showing an example of the data base of the solar cell information Ipv. This data base is made up by correcting the measurement data of the public institutes and research institutes and accumulating the data measured in-house.

In step S15 (target short-circuit current value calculation step), a target short-circuit current value Iscref of the solar cell 60 is calculated according to the following Equation 1 in the CPU 12 of the second calculation section 122 of the control section 10.

$$Iscref = \int Sc(\lambda) \cdot P(\lambda) d\lambda \qquad \text{Equation 1}$$

where:
Iscref: the target short-circuit current value of the solar cell 60;
$Sc(\lambda)$ is the estimated spectral irradiance of the natural sunlight;
$P(\lambda)$ is the spectral sensitivity of the solar cell 60; and
$\lambda$ is a wavelength of light.

The target short-circuit current value Iscref functions as the target value of adjustment of the present invention.

In step S16 (measurement step), the spectral irradiance $L(\lambda)$ of the irradiation light of the solar simulator 20 is measured with the measurement section 30 placed at the position on the base 40 at which the solar cell is placed.

In step S17 (estimated short-circuit current value calculation step), an estimated short-circuit current value Iscx of the solar cell 60 is calculated according to the following Equation 2 in the second calculation section 122 of the CPU 12 of the control section 10.

$$Iscx = \int L(\lambda) \cdot P(\lambda) d\lambda \qquad \text{Equation 2}$$

where:
$L(\lambda)$ is the spectral irradiance of the irradiation light of the solar simulator 20;
$P(\lambda)$ is the spectral sensitivity of the solar cell 60; and
$\Lambda$ is a wavelength of light.

The steps S15 and S17 function as the second calculation step of the present invention. In addition, the estimated short-circuit current value Iscx functions as the estimated light amount value of the solar simulator of the present invention.

In step S18 (display step), the information for adjustment Iadj is displayed on the display 15. The information for adjustment Iadj is information for adjusting the irradiation light amount of the solar simulator 20, including the target short-circuit current value Iscref of the solar cell 60 calculated in step S15 and the estimated short-circuit current value Iscx calculated in step S17.

In step S19 (light amount adjustment step), the light amount adjustment section 22 of the solar simulator 20 is manually operated by an adjustment operator to adjust the irradiation light amount on the basis of the information for adjustment Iadj displayed on the display 15. The adjustment is done such that: when the estimated short-circuit current value Iscx is equal to or less than the target short-circuit current value Iscref, the light amount of the solar simulator 20 is adjusted to increase; and when the estimated short-circuit current value Iscx is greater than the target short-circuit current value Iscref, the solar simulator 20 is adjusted to decrease, so that the estimated short-circuit current value Iscx falls within an acceptable error range of the target short-circuit current value Iscref.

The operator input the "termination of adjustment" by operating the keyboard of the input section 11, for example, when the adjustment is determined to be completed. After a predetermined time has passed after the display in step S18, it is confirmed in step S20 (adjustment completion confirmation step) whether the "completion of adjustment" has been input. If the "completion of adjustment" has been input (step S20, Yes), it is determined that the adjustment of light amount of the solar simulator 20 have been completed, and the above-described operation is then terminated.

If the "completion of adjustment" has not been input (step S20, No), the flow goes back to step S16, and the operations of step S16 to step S20 are repeated every predetermined time period.

Alternatively, instead of operator's adjustment, the light amount adjustment may be automatically done such that the control section 10 controls the light amount adjustment section 22 so that the estimated short-circuit current value Iscx of the solar cell 60 calculated in step S17 falls within an acceptable error range of the target short-circuit current value Iscref of the solar cell 60 calculated in step S15.

Through the above-described operations, the light amount of the irradiation light of the solar simulator 20 has been adjusted under a measurement condition close to the measurement condition MCc input in step S11. Thus, the measurement of the characteristics of the solar cell 60, for example, a current-voltage characteristic (I-V characteristics) with the thus adjusted solar simulator 20 allows the evaluation of the solar cell 60 for an arbitrary place and time. In addition, based on the measured characteristics, the photoelectric conversion efficiency and the electric-generating capacity of the solar cell 60 can be evaluated.

Alternatively, as a method for determining the estimated spectral irradiance $Sc(\lambda)$ in step S13 of FIG. 2, instead of the above-described method using the spectral irradiance $S(\lambda)$ of the place and time closest to the measurement condition MCc as the estimated spectral irradiance $Sc(\lambda)$, there is a method in which calculation is made by using a plurality pieces of a natural sunlight information SI.

For example, if data of a measurement condition identical to the measurement condition MCc having been input in step S11 is not found in step S12, a piece of the natural sunlight information SI for each of the places and times for the two measurement places closest to the measurement place having been input is read out from the plurality pieces of a natural sunlight information SI stored in the first storage section 131.

As an example, if there is no place data found which coincides with (1) Takatsuki-city Osaka-prefecture Japan, (2) 34°51' latitude north, 135°37' longitude east, and (3) February 23, 10 o'clock AM of the input measurement condition MCc, the spectral irradiance $S(\lambda)$ data for (1) Osaka-city Osaka-prefecture Japan, (2) 34°41' altitude north, 135°30' longitude east, and (3) February 23, 8 o'clock AM and the spectral irradiance $S(\lambda)$ data for (1) Kyoto-city Kyoto-prefecture Japan, (2) 35°01' altitude north, 135°46' longitude east, and (3) February 23, 11 o'clock AM are read out.

Then, in step S13, by linear interpolating the two pieces of readout spectral irradiance $S(\lambda)$ data, the estimated spectral irradiance Sc(λ) of the natural sunlight for the input measurement condition MCc is calculated.

Further, the estimated spectral irradiance Sc(λ) of the natural sunlight under the input measurement condition MCc may be calculated by reading out a plurality of pieces of data for three or more of nearby places and close times and dates and high-order-curve interpolating.

As described above, according the embodiment of the solar simulator light-amount evaluation apparatus of the present invention: the estimated spectral irradiance of the natural sunlight under the measurement condition including the place and the time and date for measurement of a solar cell is calculated; the target value of adjustment and the estimated light amount value of the solar simulator under the measurement condition are calculated on the basis of the solar cell information including the spectral sensitivity of the solar cell, the estimated spectral irradiance having been calculated, and the spectral irradiance of the irradiation light of the solar simulator; and the light amount of the irradiation light of the solar simulator is calculated, based on the calculation result, whereby a solar simulator light-amount evaluation apparatus and a solar simulator light-amount evaluation method are provided in which the characteristics of a solar cell for an arbitrary place and an arbitrary time and date can be evaluated by using the existing solar simulator.

Figure 5:
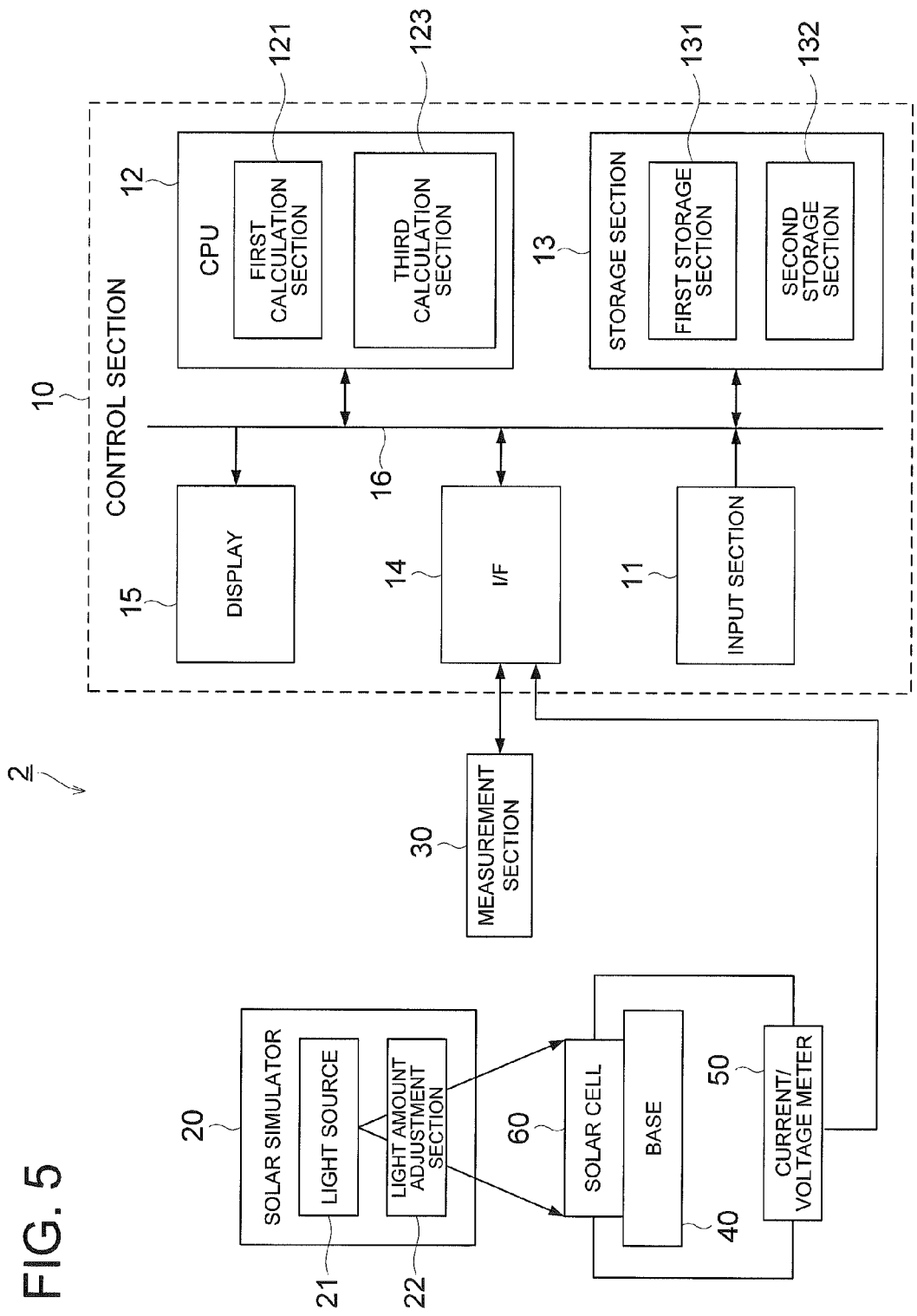
FIG. 5 is a block diagram showing an example of a configuration of an embodiment of the solar cell evaluation apparatus.

Next, an embodiment of the solar cell evaluation apparatus according to the present invention will be described with reference to FIG. 5. FIG. 5 is a block diagram showing an example of a configuration of the embodiment of the solar cell evaluation apparatus.

The above description shows that with the above-described solar simulator light-amount evaluation apparatus, the solar cell can be evaluated for an arbitrary place and an arbitrary time and date by using the existing solar simulator, by adjusting the light amount of the irradiation light of the solar simulator on the basis of the calculated target short-circuit current value Iscref. However, with the solar cell evaluation apparatus to be described below, the solar cell can be evaluated for an arbitrary place and arbitrary time and date by calculation instead of adjusting the light amount of the irradiation light of the solar simulator.

In FIG. 5, a solar cell evaluation apparatus 2 is made up of a control section 10, a measurement section 30, and the like, and used with a solar simulator 20, a base 40, and a current/voltage meter 50 to evaluate a solar cell.

The control section 10 is a personal computer (PC) or a measuring instrument, for example, and is made up of an input section 11, a CPU 12, a storage section 13, an I/F section 14, a display 15, and the like. The solar cell evaluation apparatus 2 is different from the above-described solar simulator light-amount evaluation apparatus 1 in that the CPU 12 has a third calculation section 123 for calculating the converted short-circuit current value Iscc of the solar cell 60 instead of the second calculation section 122. The other components in the control section 10 are the same as those in the control section 10 of the above-described solar simulator light-amount evaluation apparatus 1.

Since the solar simulator 20, the measurement section 30, and the base 40 are the same as those in the above-described solar simulator light-amount evaluation apparatus 1, a description thereof will be omitted.

The current/voltage meter 50 is a measuring instrument used for measuring a current-voltage characteristic (I-V characteristics) of the solar cell 60. From a measurement result of the current/voltage meter 50, characteristics including a short-circuit current value Isc, an electric-generating capacity, and a conversion efficiency of the solar cell 60 can be evaluated. However, instead of the current/voltage meter 50, a low resistor having, for example, about 0.1Ω is connected between the output terminals of the solar cell 60 to make the solar cell 60 in a short circuit state, and the short-circuit current value Isc may be measured by measuring the voltage between the output terminals.

Figure 6:
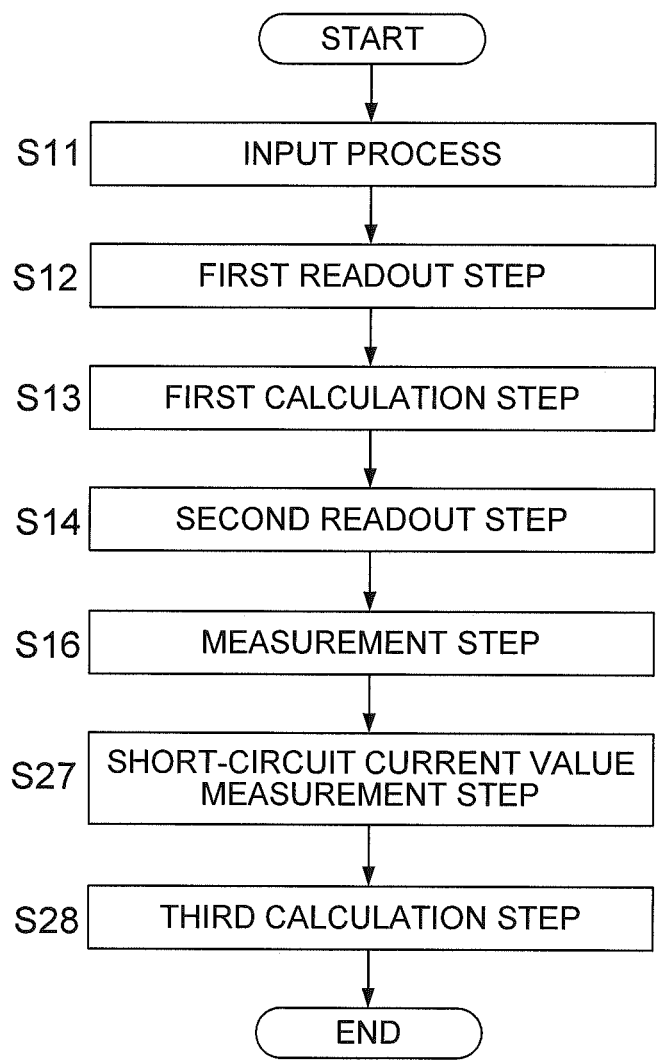
FIG. 6 is a process chart showing an example of an operation of evaluation of a solar cell of the embodiment of the solar cell evaluation apparatus.

Next, an operation of the embodiment of the solar cell evaluation apparatus according to present invention will be described with reference to FIG. 6. FIG. 6 is a process chart showing an example of an operation of the solar cell evaluation apparatus for evaluating the solar cell of the embodiment.

Since step S11 (input step) to step S14 (second readout step), and step S16 (measurement step) of FIG. 6 are the same as those in FIG. 2, a description thereof will be omitted. Step S15 of FIG. 2 is not executed in FIG. 6.

In step S27 (short-circuit current value measurement step), the solar cell 60 is placed on the base 40, and the short-circuit current value Isc of the solar cell 60 is measured under the illumination of the irradiation light of the solar simulator 20 by using the current/voltage meter 50.

In step S28 (third calculation step), the converted short-circuit current value Iscc of the solar cell 60 is calculated under the measurement condition MCc input in step S11, according to the following Equation 3 in the third calculation section 123 of the CPU 12.

$$Iscc=Isc\cdot\{\int Sc(\lambda)\cdot P(\lambda)d\lambda\}/\{\int L(\lambda)\cdot P(\lambda)d\lambda\} \quad \text{Equation 3}$$

where:
Iscc is the converted short-circuit current value of the solar cell 60:
Isc is the short-circuit current value of the solar cell 60 measured by the current/voltage meter 50;
P(λ) is the spectral sensitivity of the solar cell 60;
Sc(λ) is the estimated spectral irradiance of the natural sunlight;
L(λ) is the spectral irradiance of the irradiation light of the solar simulator 20;
λ is a wavelength of light.

Based on the converted short-circuit current value Iscc having been calculated, the solar cell 60 is evaluated under the measurement condition MCc input in step S11.

The above-described operation allows the converted short-circuit current value Iscc of the solar cell 60 for an arbitrary place and an arbitrary time and date to be estimated by calculation without adjusting the light amount of the irradiation light of the solar simulator 20. In addition, the photoelectric conversion efficiency and the electric-generating capacity of the solar cell can be evaluated on the basis of the converted short-circuit current value Iscc having been calculated.

As described above, according to the embodiment of the solar cell evaluation apparatus of the present invention: the estimated spectral irradiance of the natural sunlight is calculated under the measurement condition including the place and the time and date where and when the solar cell is subjected to measurement; and based on the estimated spectral irradiance having been calculated, the solar cell information including the previously measured spectral sensitivity of the solar cell, the spectral irradiance of the irradiation light of the solar simulator, and the short-circuit current value of the solar cell measured under the illumination of the solar simulator, the converted short-circuit current value of the solar cell is calculated under the measurement condition, whereby a solar cell evaluation apparatus and a solar cell evaluation method is provided in which the photoelectric conversion efficiency and the electric-generating capacity of a solar cell can be evaluated for an arbitrary place, time, and date by using the existing solar simulator.

Figure 7:
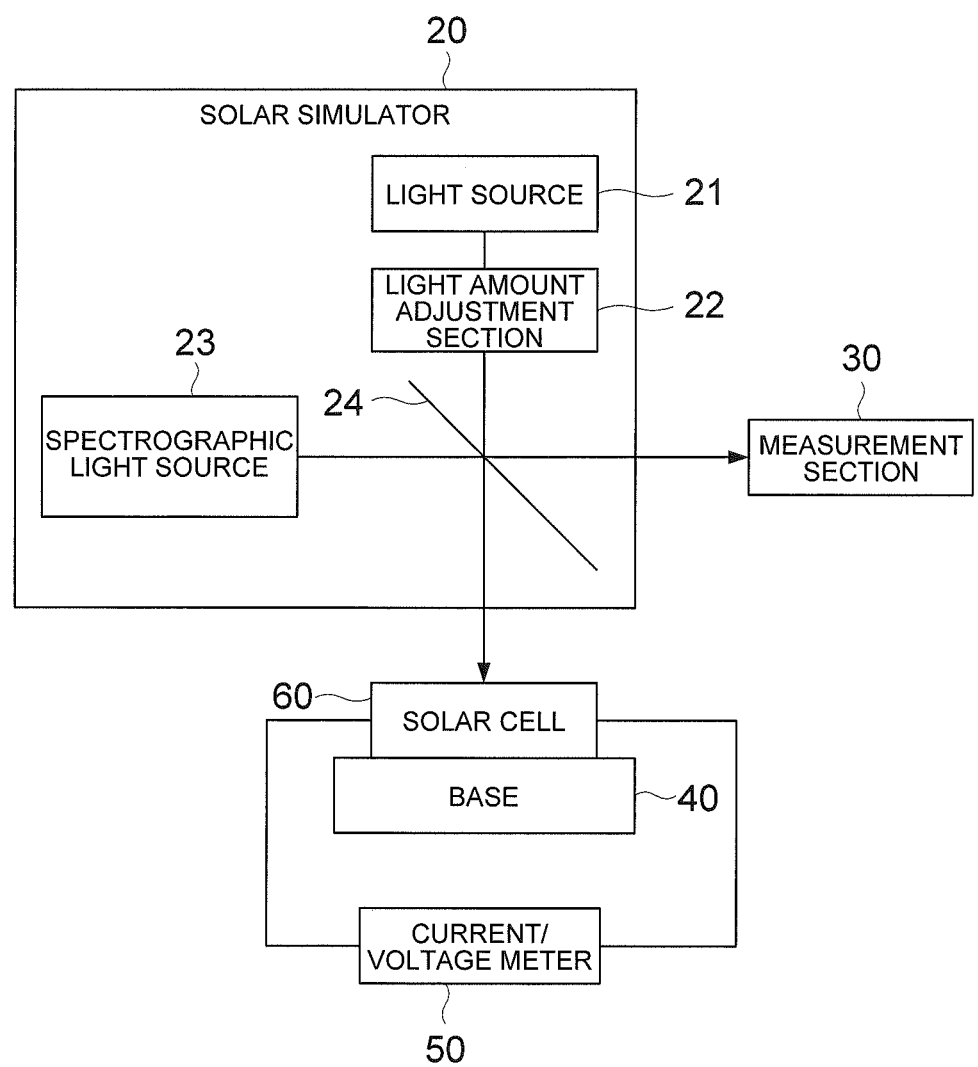
FIG. 7 is a block diagram showing an example of a configuration of another embodiment of the solar simulator.

Next, another example of the solar simulator according to the present invention will be described with reference to FIG. 7. FIG. 7 is a block diagram showing an example of a configuration of the another example of the solar simulator. The another example of the solar simulator shown in FIG. 7 can be applied to any one of the solar simulator light-amount evaluation apparatus and the solar cell evaluation apparatus according to the present invention.

In FIG. 7, a solar simulator 20 is equipped with a spectrographic light source 23 and a mirror 24 in addition to a light source 21 and a light amount adjustment section 22. The mirror 24 is detachably mounted in the light paths of the light source 21 and the spectrographic light source 23. A dispersed light beam with a single wavelength emitted from the spectrographic light source 23 is applied to the solar cell 60 on the base 40 by way of the mirror.

By measuring a short-circuit current Isc of the solar cell 60 by the current/voltage meter 50 while varying a wavelength of the light from the spectrographic light source 23, a spectral sensitivity $P(\lambda)$ of the solar cell 60 can be measured. With this arrangement, the above-described solar simulator light-amount evaluation apparatus 1 and the solar cell evaluation apparatus 2 can measure online the spectral sensitivity $P(\lambda)$ of the solar cell 60 that needed to be measured only off-line; thus no separate spectral sensitivity measuring instrument is needed.

In addition, regarding the measurement of the spectral irradiance $L(\lambda)$ of the irradiation light of the solar simulator 20, the measurement can be performed by letting the light beam from the light source 21 be reflected on the mirror 24 and be led to the measurement section (spectroradiometer) 30.

As described above, according the present invention: the estimated spectral irradiance of the natural sunlight under the measurement condition including the place and the time and date where and when the solar cell is subjected to measurement is calculated; and the target value of adjustment and the estimated light amount value of the solar simulator under the measurement condition are calculated, based on the solar cell information including the spectral sensitivity of the solar cell, the estimated spectral irradiance having been calculated, and the spectral irradiance of the irradiation light of the solar simulator, whereby a solar simulator light-amount evaluation apparatus and a solar simulator light-amount evaluation method is provided in which the characteristics of a solar cell for an arbitrary place and an arbitrary time and date can be evaluated by using the existing solar simulator.

Alternatively, the estimated spectral irradiance of the natural sunlight under the measurement condition including the place and the time and date where and when the solar cell is subjected to measurement; based on the estimated spectral irradiance having been calculated, the solar cell information of the spectral sensitivity of the solar cell, the spectral irradiance of the irradiation light of the solar simulator, and the short-circuit current value of the solar cell measured under the solar simulator, the converted short-circuit current value of the solar cell under the measurement condition is calculated, whereby a solar cell evaluation apparatus and a solar cell evaluation method are provided in which the characteristics of a solar cell for an arbitrary place and an arbitrary time, and date can be measured by using the existing solar simulator.

The detailed configurations and the operations constituting the solar simulator light-amount evaluation apparatus, the solar simulator light-amount evaluation method, the solar cell evaluation apparatus, and the solar cell evaluation method according to the present invention can be arbitrary modified without departing from the spirit of the present invention.

DESCRIPTION OF THE NUMERALS

1: Solar simulator light-amount evaluation apparatus
10: Control section
11: Input section
12: CPU
121: First calculation section
122: Second calculation section
123: Third calculation section
13: Storage section
131: First storage section
132: Second storage section
14: Interface (I/F)
15: Display
20: Solar simulator
21: Light source
22: Light amount adjustment section
30: Measurement section
40: Base
50: Current/voltage meter
60: Solar cell
MCc: Measurement condition of the solar cell
SI: Natural sunlight information
$S(\lambda)$: Spectral irradiance of the natural sunlight
$Sc(\lambda)$: Estimated spectral irradiance of the natural sunlight
Iscref: Target short-circuit current value
$L(\lambda)$: Spectral irradiance of the of irradiation light of the solar simulator 20
Iscx: Estimated short-circuit current value of the solar cell 60
Iscc: Converted short-circuit current value of the solar cell 60
Iadj: Information for adjustment
Isc: Short-circuit current value of the solar cell 60 measured for the current/voltage meter 50
$P(\lambda)$: Spectral sensitivity of the solar cell 60
$\lambda$: Wavelength of light

The invention claimed is:

1. A solar simulator light-amount evaluation apparatus for adjusting a light amount of a solar simulator used as an illumination light source used for measuring characteristics of a solar cell, the apparatus comprising:
a measurement section configured to measure a spectral irradiance of irradiation light of the solar simulator;
an input section configured to input a measurement condition including at least a place and a time and date;
a first calculation section configured to calculate an estimated spectral irradiance of a natural sunlight based on the measurement condition input by the input section;
a solar cell information storage section configured to store solar cell information including a spectral sensitivity of the solar cell in advance; and
a second calculation section configured to calculate a target value of adjustment of the light amount of the solar simulator under the measurement condition on the basis of the estimated spectral irradiance calculated by the first calculation section and the solar cell information stored in the solar cell information storage section, and configured to calculate an estimated light amount of the solar simulator on the basis of the measured spectral irradiance by the measurement section and the stored solar cell information stored in the solar cell information storage section;

wherein the solar simulator includes a light amount adjustment section configured to adjust an irradiation light amount of the solar simulator;

the second calculation section calculates a target short-circuit current value of the solar cell, which is the target value of adjustment, according to the following Equation 1, and calculates an estimated short-circuit current value of the solar cell, which is the estimated light amount, according to the following Equation 2; and the light amount adjustment section adjusts the irradiation light amount of the solar simulator based on a result of the second calculation section so that the estimated short-circuit current value having been calculated falls within a predetermined range of the calculated target short-circuit current value:

$$Iscref = \int Sc(\lambda) \cdot P(\lambda) d\lambda \qquad \text{Equation 1}$$

$$Iscx = \int L(\lambda) \cdot P(\lambda) d\lambda \qquad \text{Equation 2}$$

where:
Iscref is the target short-circuit current value of the solar cell;
Iscx is the estimated short-circuit current value of the solar cell;
$P(\lambda)$ is the spectral sensitivity of the solar cell;
$Sc(\lambda)$ is the estimated spectral irradiance of the natural sunlight;
$L(\lambda)$ is the spectral irradiance of the irradiation light of the solar simulator; and
$\lambda$ is a wavelength of light.

2. The solar simulator light-amount evaluation apparatus of claim 1, comprising:
a display configured to display the calculated target value of adjustment of the light amount and the estimated light amount output by an output section.

3. The solar simulator light-amount evaluation apparatus of claim 1, comprising:
a first storage section configured to store a plurality pieces of natural sunlight information including spectral irradiances of the natural sunlight measured under a plurality of measurement conditions including at least one kind of different places and time and dates,
wherein the first calculation section sets the spectral irradiance of the natural sunlight information measured under the measurement condition which coincides with or is closest to the input measurement condition as the estimated spectral irradiance.

4. The solar simulator light-amount evaluation apparatus of claim 1, comprising:
a first storage section configured to store a plurality pieces of natural sunlight information including spectral irradiances of the natural sunlight measured under a plurality of measurement conditions including at least different places and time and dates,
wherein the first calculation section calculates the estimated spectral irradiance by linear interpolating the spectral irradiances in the natural sunlight information measured each at each of the time and dates closest to the time and date in the input measurement condition at two places closest to the place in the input measurement condition.

5. The solar simulator light-amount evaluation apparatus of claim 1, comprising:
a first storage section configured to store a plurality pieces of natural sunlight information including spectral irradiances of the natural sunlight measured under a plurality of measurement conditions including at least different places and different time and dates,
wherein the first calculation section calculates the estimated spectral irradiance by high-order curve interpolating the spectral irradiances in the natural sunlight information measured at the time and dates close to the time and date in the input measurement condition at a plurality of places close to the place in the input measurement condition.

6. A solar simulator light-amount evaluation method for adjusting a light amount of a solar simulator used as an illumination light source used for measuring characteristics of a solar cell, the method comprising:
an input step comprising inputting a measurement condition including at least a place and a time and date;
a first calculation step comprising calculating an estimated spectral irradiance of a natural sunlight based on the measurement condition;
a solar cell information readout step comprising reading out a previously stored solar cell information including a spectral sensitivity of the solar cell;
a measurement step comprising measuring a spectral irradiance of an irradiation light of the solar simulator;
a second calculation step comprising calculating a target value of adjustment of the light amount of the solar simulator, under the measurement condition, on the basis of the estimated spectral irradiance calculated in the first calculation step and the solar cell information read out in the solar cell information readout step, and for calculating an estimated light amount of the solar simulator on the basis of the measured spectral irradiance and the read out solar cell information; and
a light amount adjustment step comprising adjusting an irradiation light amount of the solar simulator,
wherein in the second calculation step, a target short-circuit current value of the solar cell, which is the target value of adjustment, is calculated according to the following Equation 1, and an estimated short-circuit current value of the solar cell, which is the estimated light amount, is calculated according to the following Equation 2, and
wherein in the light amount adjustment step, the irradiation light amount of the solar simulator is adjusted based on a result from the second calculation section so that the estimated short-circuit current value having been calculated falls within a predetermined range of the calculated target short-circuit current value:

$$Iscref = \int Sc(\lambda) \cdot P(\lambda) d\lambda \qquad \text{Equation 1}$$

$$Iscx = \int L(\lambda) \cdot P(\lambda) d\lambda \qquad \text{Equation 2}$$

where:
Iscref is the target short-circuit current value of the solar cell;
Iscx is the estimated short-circuit current value of the solar cell;
$P(\lambda)$ is the spectral sensitivity of the solar cell;
$Sc(\lambda)$ is the estimated spectral irradiance of the natural sunlight;
$L(\lambda)$ is the spectral irradiance of the irradiation light of the solar simulator; and
$\lambda$ is a wavelength of light.

7. The solar simulator light-amount evaluation method of claim 6, comprising:
a display step comprising displaying the calculated target value of adjustment and the estimated light amount.

8. The solar simulator light-amount evaluation method of claim 6, comprising:
a first readout step comprising reading out natural sunlight information measured under the measurement condition which coincides with or is closest to the input measurement condition, from a plurality pieces of natural sunlight information including spectral irradiances of the natural sunlight measured under a plurality of measurement conditions including at least one kind of previously stored different places and time and dates,
wherein in the first calculation step, the spectral irradiance of the read out natural sunlight information is set as the estimated spectral irradiance.

9. The solar simulator light-amount evaluation method of claim 6, comprising:
a first readout step comprising reading out pieces of natural sunlight information each measured under each of the time and dates closest to the time and date in the input measurement condition at two places closest to the place in the input measurement condition, from a plurality pieces of natural sunlight information including spectral irradiances of the natural sunlight measured under a plurality of measurement conditions including at least one kind of previously stored different places and time and dates,
wherein in the first calculation step, the estimated spectral irradiance is calculated by linear interpolating the spectral irradiances in the read out natural sunlight information.

10. The solar simulator light-amount evaluation method of claim 6, comprising:
a first readout step comprising reading out a plurality pieces of natural sunlight information measured at the time and dates close to the time and date in the input measurement condition at a plurality of places close to the place in the input measurement condition, from a plurality pieces of natural sunlight information including the spectral irradiance of the natural sunlight measured under a plurality of measurement conditions including at least one kind of previously stored different places and different time and dates,
wherein in the first calculation step, the estimated spectral irradiance is calculated by high-order curve interpolating the spectral irradiances in the read out plurality pieces of natural sunlight information.

11. The solar simulator light-amount evaluation apparatus of claim 1, wherein the measuring unit comprises a spectroradiometer.

12. The solar simulator light-amount evaluation method of claim 6, wherein the measurement step comprises measuring a spectral irradiance of an irradiation light of the solar simulator using a spectroradiometer.

13. A solar simulator light-amount evaluation system comprising:
a solar simulator comprising an illumination light source used for measuring characteristics of a solar cell and a light amount adjustment section configured to adjust an irradiation light amount of the solar simulator; and
a solar simulator light-amount evaluation apparatus configured to adjust a light amount of the solar simulator;
wherein the solar simulator light-amount evaluation apparatus comprises:
a measurement section configured to measure a spectral irradiance of irradiation light of the solar simulator;
an input section configured to input a measurement condition including at least a place and a time and date;
a first calculation section configured to calculate an estimated spectral irradiance of a natural sunlight based on the input measurement condition by the input section;
a solar cell information storage section configured to store solar cell information including a spectral sensitivity of the solar cell in advance; and
a second calculation section configured to calculate a target value of adjustment of the light amount of the solar simulator under the measurement condition on the basis of the estimated spectral irradiance calculated by the first calculation section and the solar cell information stored in the solar cell information storage section, and configured to calculate an estimated light amount of the solar simulator on the basis of the measured spectral irradiance by the measurement section and the stored solar cell information stored in the solar cell information storage section,
wherein the light amount adjustment section adjusts the irradiation light amount of the solar simulator based on the target value of adjustment of the light amount and the estimated spectral irradiance calculated by the second calculation section;
the second calculation section calculates a target short-circuit current value of the solar cell, which is the target value of adjustment, according to the following Equation 1, and calculates an estimated short-circuit current value of the solar cell, which is the estimated light amount, according to the following Equation 2; and
the light amount adjustment section adjusts the irradiation light amount of the solar simulator based on a result of the second calculation section so that the estimated short-circuit current value having been calculated falls within a predetermined range of the calculated target short-circuit current value:

$$Iscref = \int Sc(\lambda) \cdot P(\lambda) d\lambda \qquad \text{Equation 1}$$

$$Iscx = \int L(\lambda) \cdot P(\lambda) d\lambda \qquad \text{Equation 2}$$

where:
Iscref is the target short-circuit current value of the solar cell;
Iscx is the estimated short-circuit current value of the solar cell;
$P(\lambda)$ is the spectral sensitivity of the solar cell;
$Sc(\lambda)$ is the estimated spectral irradiance of the natural sunlight;
$L(\lambda)$ is the spectral irradiance of the irradiation light of the solar simulator; and
$\lambda$ is a wavelength of light.

* * * * *